J. F. WEIDNER.
PEDAL LOCK.
APPLICATION FILED JULY 24, 1920.

1,371,958. Patented Mar. 15, 1921.

J. F. Weidner,
INVENTOR

BY Victor J. Evans.
ATTORNEY

UNITED STATES PATENT OFFICE.

JOHN FRED WEIDNER, OF EDWARDSVILLE, ILLINOIS.

PEDAL-LOCK.

1,371,958.    Specification of Letters Patent.    Patented Mar. 15, 1921.

Application filed July 24, 1920. Serial No. 398,638.

*To all whom it may concern:*

Be it known that I, JOHN F. WEIDNER, a citizen of the United States, residing at Edwardsville, in the county of Madison and State of Illinois, have invented new and useful Improvements in Pedal-Locks, of which the following is a specification.

This invention relates to a locking device for automobiles for preventing unauthorized use of the automobile and the principal object of the invention is to provide means for locking the foot pedals against movement.

Another object of the invention is to provide a two part device, the two parts of which are hinged together and provided with notches for engaging the pedals with means for locking the two parts together.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
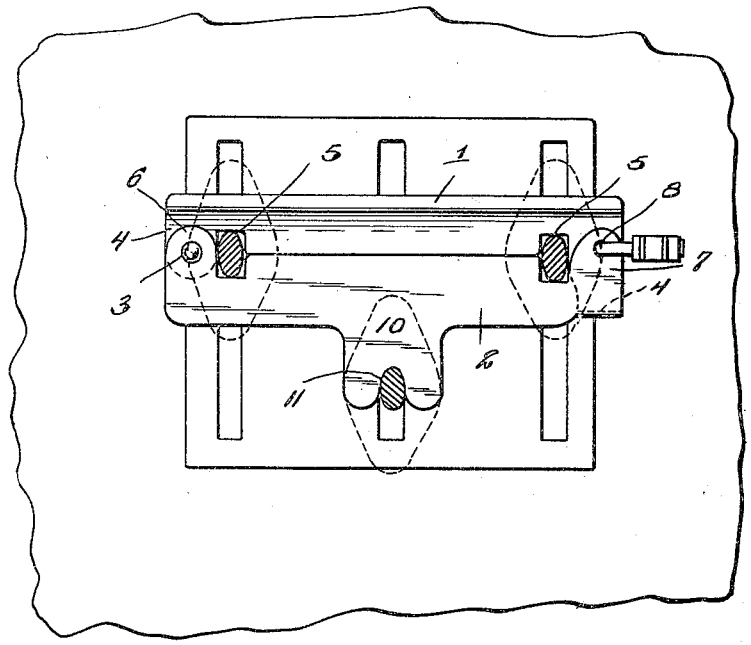
Figure 1 is a diagrammatic view showing the invention in locking engagement with the pedals of an automobile.
Figure 2:
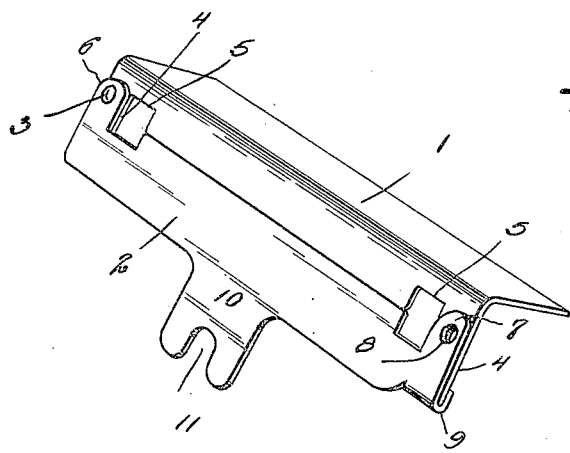
Fig. 2 is a view of the device itself.

As shown in these views the device comprises a main member 1 and a main member 2, the two members being hinged together by the bolt 3. The member 1 is of angle form with one flange cut away to form a finger 4 at each end and a notch 5 at the base of each finger. The member 2 is formed of a flat piece of material and this member also has the end fingers 6 and the notches 7 adjacent the fingers. The hinge bolt passes through one set of fingers as shown, said fingers overlapping while the other set of fingers are provided with holes 8 for receiving a padlock or the like. The member 2 has a portion turned up as at 9 to form a keeper for the end of the lock finger on the first member. As will be seen when the two members are in engaged position the notches will register and these notches are so arranged that they will engage with the brake pedal and the clutch pedal. The member 2 is provided with a tongue 10 on its outer edge and said tongue is notched as at 11 to receive the reverse pedal. The engagement of the device with the three pedals is clearly shown in Fig. 1. The member 1 will rest on the inclined part of the floor and when the two members are locked together the pedals are held against movement and thus it is impossible for an unauthorized person to use the car without the consent of the driver.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A pedal lock for automobiles comprising a main member of angle shape in cross section, a finger at each end thereof and a notch at the base of each finger, a second member having a finger at each end and a notch at the base of each finger, a bolt passing through a finger on each member for hingedly connecting the parts together, the other set of fingers having openings therein for receiving a lock for locking the parts in position with the notches in alinement, a tongue on the outer edge of the second member and a notch in said tongue for receiving the reverse pedal, the brake and clutch pedals being engaged by the other notches.

In testimony whereof I affix my signature.

JOHN FRED WEIDNER.